United States Patent
Wang

(10) Patent No.: US 8,212,374 B2
(45) Date of Patent: Jul. 3, 2012

(54) WIND POWER GENERATOR

(76) Inventor: Yili Wang, Beijing (CN)

( * ) Notice: Subject to any disclaimer, the term of this patent is extended or adjusted under 35 U.S.C. 154(b) by 0 days.

(21) Appl. No.: 13/204,636

(22) Filed: Aug. 5, 2011

(65) Prior Publication Data

US 2011/0285144 A1 Nov. 24, 2011

Related U.S. Application Data

(63) Continuation of application No. PCT/CN2010/070482, filed on Feb. 2, 2010.

(30) Foreign Application Priority Data

Feb. 6, 2009 (CN) .......................... 2009 1 0067822

(51) Int. Cl.
*F03D 9/00* (2006.01)
(52) U.S. Cl. ...................................... 290/55; 416/132 B
(58) Field of Classification Search ........................ None
See application file for complete search history.

(56) References Cited

U.S. PATENT DOCUMENTS

| | | | | |
|---|---|---|---|---|
| 4,311,435 A | * | 1/1982 | Bergero | 416/170 R |
| 4,329,593 A | * | 5/1982 | Willmouth | 290/44 |
| 4,508,972 A | * | 4/1985 | Willmouth | 290/55 |
| 7,321,173 B2 | * | 1/2008 | Mann | 290/55 |
| 7,750,494 B1 | * | 7/2010 | Behrens et al. | 290/55 |
| 8,039,985 B2 | * | 10/2011 | Lin | 290/55 |
| 2004/0047723 A1 | * | 3/2004 | Horjus | 415/4.2 |
| 2008/0050237 A1 | * | 2/2008 | Lee | 416/197 A |
| 2011/0085909 A1 | * | 4/2011 | Chapman | 416/174 |
| 2011/0169334 A1 | * | 7/2011 | Williams | 307/72 |

* cited by examiner

*Primary Examiner* — Michael Zarroli
(74) *Attorney, Agent, or Firm* — Matthias Scholl P.C.; Matthias Scholl

(57) ABSTRACT

A constant-speed wind power generator including a plurality of wind scoops, at least two wind-catching cylinders, a fan, a vertical shaft, a steering gear, a first booster, a spring wheel, a second booster, an accelerator, a generator, and an iron tower. The first booster and second booster respectively comprise gears meshed with each other with diameters from small to large. The accelerator comprises a plurality of gear drive mechanisms with different diameters and the diameter of a driving gear of each gear drive mechanism is greater than that of a driven gear. The vertical shaft is disposed on the iron tower, and a plurality of the wind scoops are fixed on the vertical shaft. The fan is fixed on the vertical shaft corresponding to the wind-catching cylinders. The generator is capable of producing a stable power generation.

4 Claims, 1 Drawing Sheet

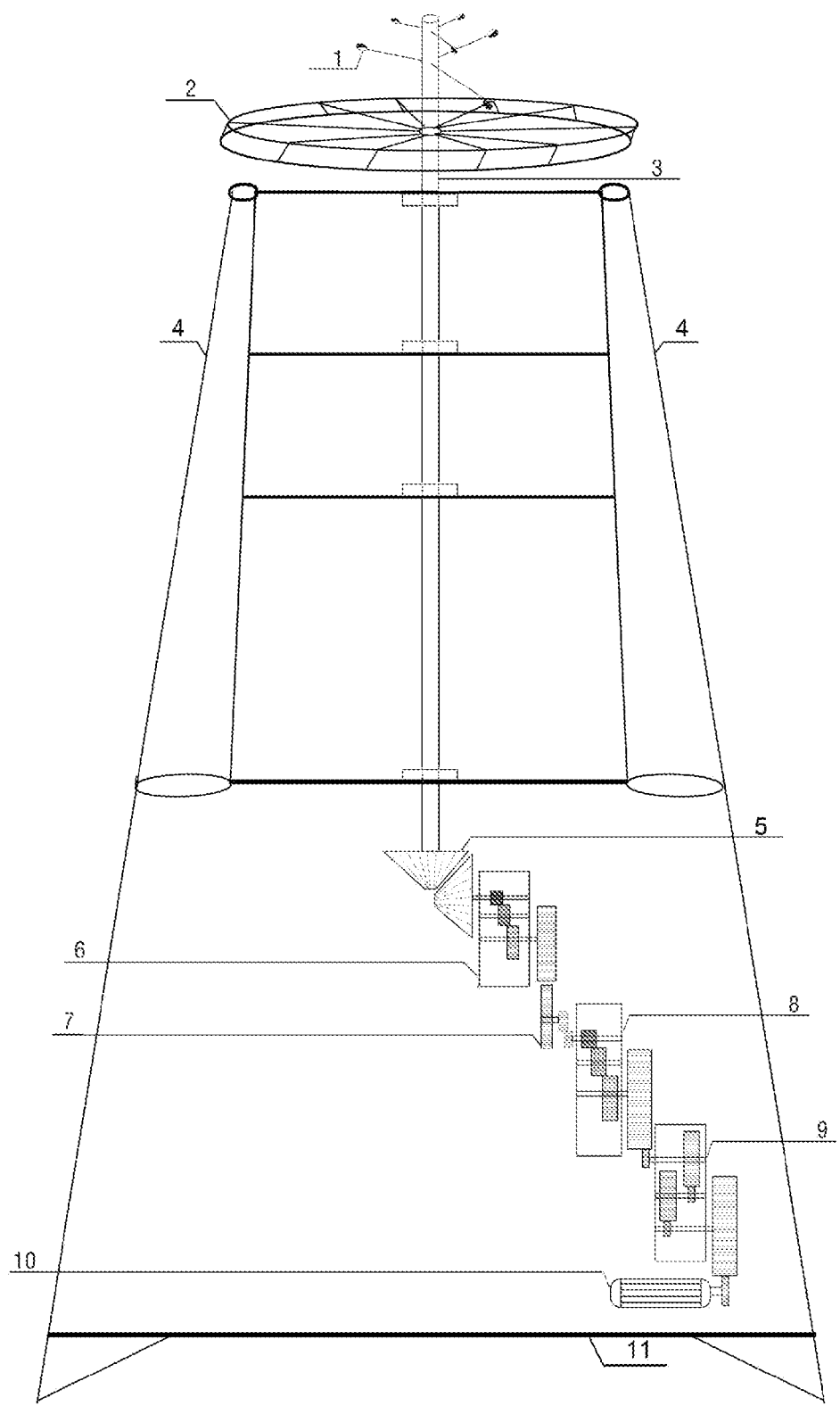

WIND POWER GENERATOR

CROSS-REFERENCE TO RELATED APPLICATIONS

This application is a continuation of International Patent Application No. PCT/CN2010/070482 with an international filing date of Feb. 2, 2010, designating the United States, now pending, and further claims priority benefits to Chinese Patent Application No. 200910067822.0 filed Feb. 6, 2009. The contents of all of the aforementioned applications, including any intervening amendments thereto, are incorporated herein by reference.

BACKGROUND OF THE INVENTION

1. Field of the Invention

The invention relates to a wind power generator, and more particularly to a constant-speed wind power generator capable of generating stable electric energy using wind energy from multiple directions.

2. Description of the Related Art

Conventional wind power generators can only use wind energy from horizontal direction for power generation and cannot use that from vertical direction. However, subject to the influence of seasons, geological environment, day and night, etc., the horizontal wind energy is unstable. Thus, the electric energy production of conventional generators is unstable and difficult for synchronization. Moreover, the generator is often fixed on an iron tower, thereby improving the load thereof.

SUMMARY OF THE INVENTION

In view of the above-described problems, it is one objective of the invention to provide a constant-speed wind power generator capable of generating stable electric energy using wind energy from multiple directions.

To achieve the above objective, in accordance with one embodiment of the invention, there is provided a constant-speed wind power generator comprising a plurality of wind scoops, at least two wind-catching cylinders, a fan, a vertical shaft, a steering gear, a first booster, a spring wheel, a second booster, an accelerator, a generator, and an iron tower, wherein the first booster and second booster respectively comprises gears meshed with each other with diameters from small to large; the accelerator comprises a plurality of gear drive mechanisms with different diameters and the diameter of a driving gear of each gear drive mechanism is greater than that of a driven gear; the vertical shaft is disposed on the iron tower, and a plurality of the wind scoops are fixed on the vertical shaft; at least two wind-catching cylinders with a large top opening and a small bottom opening are fixed on the iron tower; the fan is fixed on the vertical shaft corresponding to the wind-catching cylinders; the vertical shaft is connected to a gear shaft of an input end of the first booster via the steering gear; a gear of an output end of the first booster is meshed with the spring wheel, and an output shaft of the spring wheel is connected in turn to the second booster, accelerator, and generator fixed on the ground via the gear drive mechanisms.

In a class of this embodiment, a plurality of the wind-catching cylinders, e.g., from 2 to 4 in number, is evenly distributed on the periphery of the iron tower.

In a class of this embodiment, the plurality of the wind scoops is provided in multi-layers, with at least 3 ones in each layer. The openings of the wind scoops are arranged clockwise or counterclockwise in the same direction.

In a class of this embodiment, the wind scoops in the multi-layers are arranged in a shape of pyramid.

Advantages of the invention are summarized below:

1. The wind power generator can not only use the wind energy from horizontal direction as the mechanical energy for power generation by use of the wind scoops, but also use the vertical wind energy arising from the natural phenomena such as the pressure and temperature differences and the going up hot air and going down cold air as the mechanical energy for power generation by use of the wind-catching cylinders. The mechanical energy outputted by the vertical shaft is transferred to the spring wheel via the steering gear and the first booster, so that it can be stored at the spring wheel and outputted at a constant rate. The mechanical energy is further boosted by the second booster and accelerator, which can meet the rotation speed requirements of the generator and provides a stable and constant power production independent of the conditions such as seasons, geological environment, day and night and making the synchronization easier.

2. The wind power generator is provided with multi-layers of the wind scoops which are scoop-shaped and thus have greater wind catching capacity than that of the fan, and thus stable and cost-effective wind power generation is achieved.

3. The wind scoops are not directly contacted to the generator, and by rotating, the wind scoop transfers the primitive power to the generator on the ground via the vertical shaft and the multi-stage transmission devices. The generator is provided on the ground, thereby relieving the load of the iron tower.

BRIEF DESCRIPTION OF THE DRAWINGS

The invention is described hereinbelow with reference to accompanying drawings, in which the sole FIGURE is a schematic diagram of a constant-speed wind power generator capable of generating power using wind energy from multiple directions according to one embodiment of the invention.

DETAILED DESCRIPTION OF THE EMBODIMENTS

The invention is illustrated in detail as follows based on the drawings and the specific embodiment.

As shown in FIG. 1, a constant-speed wind power generator comprises a plurality of wind scoops 1, at least two wind-catching cylinders 4, a fan 2, a vertical shaft 3, a steering gear 5, a first booster 6, a spring wheel 7, a second booster 8, an accelerator 9, a generator 10, and an iron tower 11. The first booster 6 and the second booster 8 respectively comprise gears meshed with each other with diameters from small to large. The accelerator 9 comprises a plurality of gear drive mechanisms with different diameters and the diameter of a driving gear of each gear drive mechanism is greater than that of a driven gear. The vertical shaft 3 is disposed on the iron tower 11. A plurality of the wind scoops 1 are fixed on the vertical shaft 3. At least two wind-catching cylinders 4 with a large top opening and a small bottom opening are fixed on the iron tower 11. The fan 2 is fixed on the vertical shaft 3 corresponding to the wind-catching cylinders 4. The vertical shaft 3 is connected with a gear shaft of an input end of the first booster 6 via the steering gear 5. A gear of an output end of the first booster 6 is meshed with the spring wheel 7, and an output shaft of the spring wheel 7 is connected in turn to the second booster 8, accelerator 9, and generator fixed on the ground 10 via the gear drive mechanisms.

For better utilizing of the vertical wind energy arising from the natural phenomena such as the pressure and temperature differences and the going up hot air and going down cold air, a plurality of the wind-catching cylinders 4, e.g., with a number from 2 to 4, are evenly arranged on the peripheral of the iron tower.

A plurality of wind scoops are provided in multi-layers, with at least 3 in each, and openings thereof are arranged clockwise or counterclockwise in the same direction, thereby allowing the wind scoops to rotate clockwise or counterclockwise at 360°. The wind scoops in multi-layers are arranged in a shape of pyramid.

The wind scoops collect the wind force in horizontal direction and transfer it to the vertical shaft. Also, the vertical wind energy in the wind-catching cylinders arising from the natural phenomenon such as the pressure and temperature differences and the going up hot air and going down cold air is transferred to the vertical shaft via the fan. The mechanical energy outputted by the vertical shaft is transferred to the spring wheel via the steering gear and first booster, so that it can be stored at the spring wheel and outputted at a constant rate, and finally transferred to the generator after boosted by the second booster and accelerator. Blown by the vertical wind from the wind-catching cylinders, the fan can rotate in synchronization with the wind scoops. The vertical wind is independent of the conditions such as seasons, geological environment, day and night, so it can meet the minimum rotational speed of the generator, thereby providing a stable and constant power production. The wind is generally pumped and lifted at a speed of around 8 m/s, and therefore, the generator is capable of maintaining a stable power generation even when the wind is below the wind scale 2.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A constant-speed wind power generator, comprising
a) a plurality of wind scoops;
b) at least two wind-catching cylinders;
c) a fan;
d) a vertical shaft;
e) a steering gear;
f) a first booster;
g) a spring wheel;
h) a second booster;
i) an accelerator;
j) a generator; and
k) an iron tower;
wherein
said first booster and second booster respectively comprise gears meshed with each other with diameters from small to large;
said accelerator comprises a plurality of gear drive mechanisms with different diameters and the diameter of a driving gear of each gear drive mechanism is greater than that of a driven gear;
said vertical shaft is disposed on said iron tower, and a plurality of said wind scoops are fixed on said vertical shaft;
at least two wind-catching cylinders with a large top opening and a small bottom opening are fixed on said iron tower;
said fan is fixed on said vertical shaft corresponding to said wind-catching cylinders;
said vertical shaft is connected to a gear shaft of an input end of said first booster via said steering gear; and
a gear of an output end of said first booster is meshed with said spring wheel, and an output shaft of said spring wheel is connected in turn to said second booster, accelerator, and generator fixed on the ground via said gear drive mechanisms.

2. The constant-speed wind power generator of claim 1, wherein said wind-catching cylinders are between 2 and 4 in number and evenly arranged on the periphery of said iron tower.

3. The constant-speed wind power generator of claim 1, wherein the plurality of said wind scoops is provided in multi-layers with at least 3 in each layer, and openings thereof are arranged clockwise or counterclockwise in the same direction.

4. The constant-speed wind power generator of claim 3, wherein said wind scoops in multi-layers are arranged in a shape of pyramid.

* * * * *